(12) United States Patent
Kawai et al.

(10) Patent No.: US 8,468,101 B1
(45) Date of Patent: *Jun. 18, 2013

(54) ELECTRONIC MONEY SYSTEM AND PAYMENT ACCEPTING APPARATUS

(75) Inventors: Shigeyuki Kawai, Tokyo (JP); Koji Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,728

(22) Filed: May 26, 2000

(51) Int. Cl.
*G06Q 40/00* (2012.01)
(52) U.S. Cl.
USPC ............... 705/69; 705/41; 705/35; 379/114
(58) Field of Classification Search
USPC .................................................. 705/35–38, 40
See application file for complete search history.

(56) References Cited

U.S. PATENT DOCUMENTS

| | | | |
|---|---|---|---|
| 5,440,621 A * | 8/1995 | Castro ...................... | 379/114.2 |
| 5,455,407 A * | 10/1995 | Rosen ............................... | 705/69 |
| 5,774,879 A * | 6/1998 | Custy et al. ..................... | 705/35 |
| 6,105,008 A * | 8/2000 | Davis et al. ..................... | 705/41 |

FOREIGN PATENT DOCUMENTS

WO   WO 97/28649   *   8/1997

OTHER PUBLICATIONS

Bob Levey. "A Check Card Can Bleed You Dry, Quickly." The Washington Post. Washington, D.C.: Oct. 21, 1998. p. D.14 (3 pages total).*
Bob Levey, A Check Card Can Bleed You Dry Quickly, The Washington Post, Oct. 21, 1998, p. D14.*

* cited by examiner

*Primary Examiner* — Siegfried E Chencinski
(74) *Attorney, Agent, or Firm* — Rader, Fishman & Grauer PLLC

(57) ABSTRACT

An electronic money system and a payment-accepting apparatus that further facilitate the use of cards substituting cash money. The electronic money use fee is computed on the basis of the information about the timing with which the amount of money data equivalent to an amount of money used are withdrawn from an information card, thereby allowing the user owning the information card to use an electronic money system regardless of whether time zones having different profit rates. Consequently, the user owning the information card always may pay by the information card, thereby enhancing the effectiveness of the information card that substitutes cash money.

22 Claims, 15 Drawing Sheets

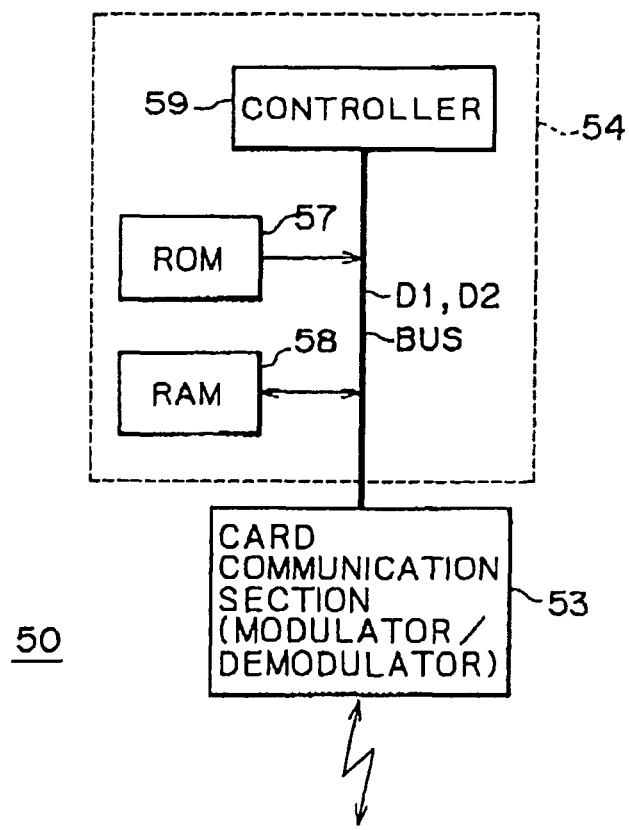

F I G. 11
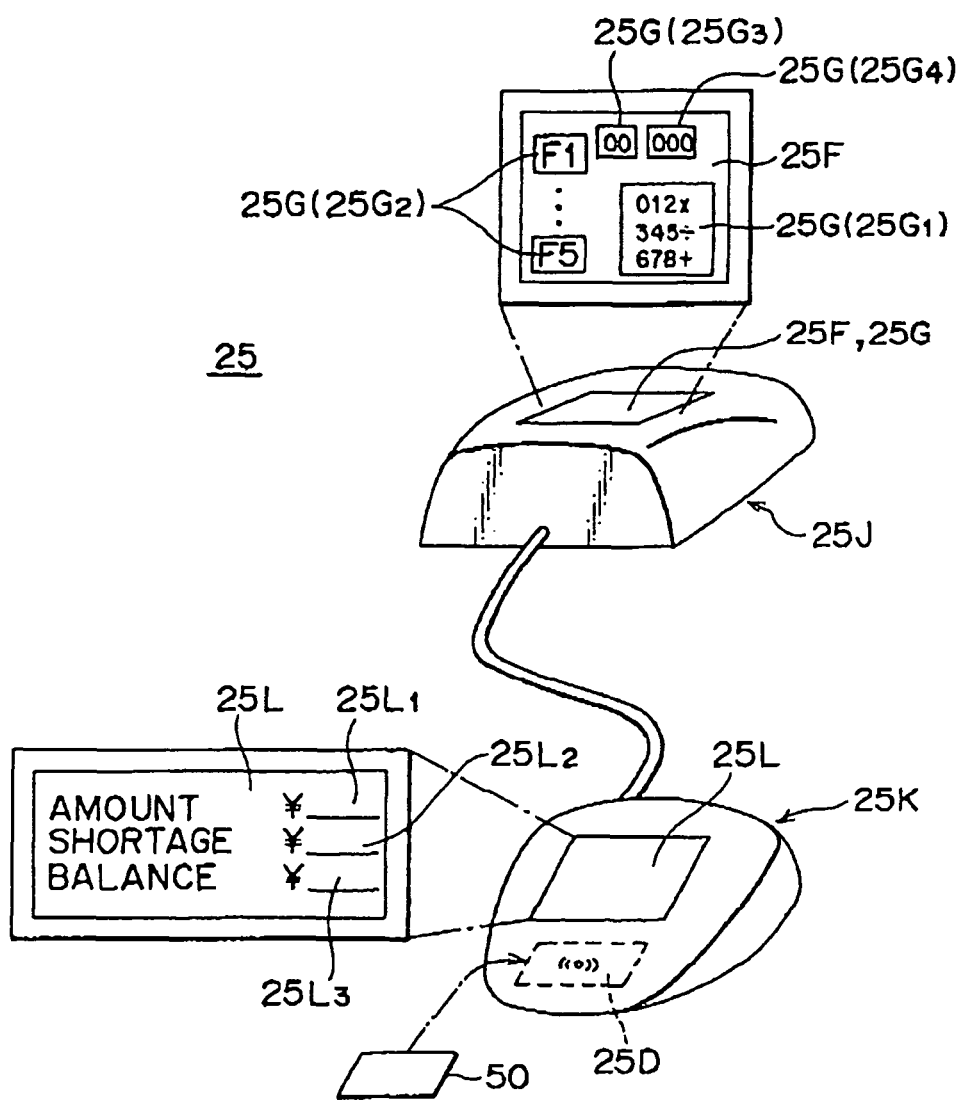

FIG. 14A

| | CONTENTS | byte |
|---|---|---|
| 1 | Card Transaction S/N (A) | |
| 2 | Log Type | |
| 3 | (Reserved) | |
| 4 | Data/Time | |
| 5 | Terminal Number | 32byte |
| 6 | Dealing Value (unsigned) | |
| 7 | Card Transaction S/N (B) | |
| 8 | Signature1 Key Version | |
| 9 | Balance Data | |
| 10 | Terminal Transaction S/N | |
| 11 | (Reserved) | |
| 12 | Signature1 | |

D23; rows labeled D231–D239

FIG. 14B

| | | byte |
|---|---|---|
| 13 | Card IDm | |
| 14 | Terminal Transaction Flag | |
| 15 | (Reserved) | 16byte |
| 16 | Signature2 Key Version | |
| 17 | Signature2 | |

D23A; rows labeled D23A1–D23A4

ELECTRONIC MONEY SYSTEM AND PAYMENT ACCEPTING APPARATUS

BACKGROUND OF THE INVENTION

The present invention relates generally to an electronic money system and a payment-accepting apparatus, which are preferably applicable to an electronic money system and a payment-accepting apparatus that are used by storing amount of money data into an information card.

Conventionally, when a user uses a cash card or a credit card issued by a bank or a credit card company, a salesperson of a store at which the user has done shopping puts the user's card into a card terminal installed in that store. The card reader terminal reads the card number recorded in the magnetic strips on the card and, at the same time, the salesperson enters the amount of money used by the user into the card terminal.

The card terminal is connected to the managing computer of the bank or the credit card company through a communication line to send the read card number and the amount of money. The managing computer of the bank or the credit card company manages information about the user's card, such as expiration date, limit credit amount, and loss or theft report, and determines the usability of the card on the basis of the information, such as the card number and the amount used supplied from the card terminal through the communication line. If the card is found usable, the managing computer of the bank or the credit card company sends back the usability information to the card terminal and, at the same time, goes through formalities for charging the amount to the bank account specified in the card.

The systems using the above-mentioned cash cards and credit cards must send requests for card use approval from the card terminal to the managing computer of the bank or the credit card company every time users want to use their cards. This causes the problem of complicating card use processing because communication line connection processing is required.

SUMMARY OF THE INVENTION

It is, therefore, an object of the present invention to provide an electronic money system and a payment-accepting apparatus that further facilitate the use of cards that substitute cash money.

In carrying out the invention and according to one aspect thereof, there is provided an electronic money system comprising: a money input terminal means through which amount of money data as, electronic money, are inputted into an information card in a predetermined input method; an electronic money-terminal means for withdrawing amount of money data equivalent to an amount of money used by a user owning the information card from the amount of money data inputted into the information card and storing information about the timing of the withdrawal; and, an electronic money-managing means for summarizing the amount of money data withdrawn from the information card by the electronic money-terminal means and the timing information and computing an electronic money-use fee on the basis of the summarized amount of money data and timing information.

In carrying out the invention and according to another aspect thereof, there is provided a payment-accepting apparatus for accepting payment of an amount of money used in the form of amount of money data corresponding to the amount of money used, comprising a computing means for computing, on the basis of information about the timing with which the amount of money data are accepted, a payment processing fee according to the amount of money data.

In carrying out the invention and according to further aspect thereof, there is provided an electronic money system comprising: a withdrawing means for withdrawing an amount of money used from a balance in an electronic apparatus having an information storage section for storing a monetary value as electronic money, the information storage section being refilled with the electronic money; an electronic money-terminal apparatus having a storage means for storing information about the timing of the withdrawal; and, an electronic money-managing means for summarizing the amount of money used withdrawn from the electronic apparatus through the electronic money-terminal apparatus and the timing information and computing an electronic money-use fee on the basis of the summarized amount of money used and timing information.

According to the above-mentioned novel configuration, the electronic money-use fee is computed on the basis of the information about the timing with which the amount of money data equivalent to an amount of money used are withdrawn from an information card, thereby allowing the user owning the information card to use an electronic money system regardless of whether time zones having different profit rates. Consequently, the user owning the information card always may pay by the information card, thereby enhancing the effectiveness of the information card that substitutes cash money.

BRIEF DESCRIPTION OF THE DRAWINGS

These and other objects of the invention will be seen by reference to the description, taken in connection with the accompanying drawing, in which:

FIG. 6 is a block diagram illustrating the configuration of the information card;

FIG. 11 is an external perspective view illustrating the electronic money terminal apparatus;

FIGS. 14A and 14B are diagrams illustrating configurations of electronic money-log data.

DETAILED DESCRIPTION OF PREFERRED EMBODIMENTS

This invention will be described in further detail by way of example with reference to the accompanying drawings.

(1) Configuration of Electronic Money System

Figure 1:
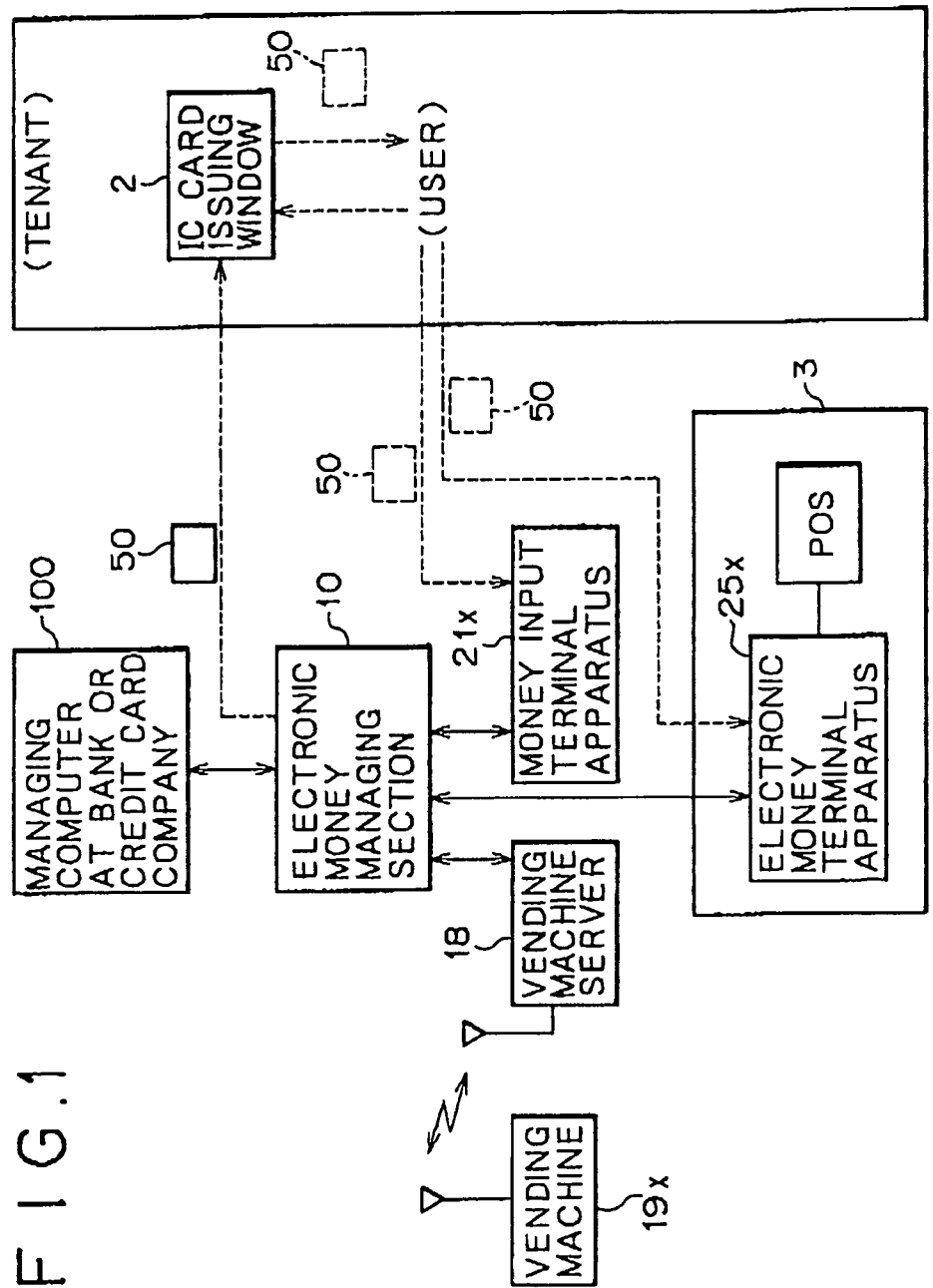
FIG. 1 is block diagram illustrating an overall configuration of an electronic money system according to the invention.

Referring to FIG. 1, reference numeral 1 denotes an electronic money system as a whole. This electronic money system 1 comprises an electronic money-managing section 10 for issuing an IC (Integrated Circuit) card 50 and managing and settling electronic money, a money input terminal apparatus $21_x$ for inputting electronic money (amount of money data) into the IC card 50, an electronic money terminal apparatus $25_x$ at each store 3 that accepts the payment by a user by means of the IC card 50 inputted with that electronic money, a vending machine $19_x$ adapted for users to purchase products by use of the IC card 50, and a vending machine server 18 for receiving and storing the usage log (amount used, date and time of use, and so on) of the IC card 50 from the vending machine $19_x$. The money input terminal apparatus $21_x$, the electronic money terminal apparatus $25_x$, and the vending machine 19 are each installed in plurality.

Figure 2:
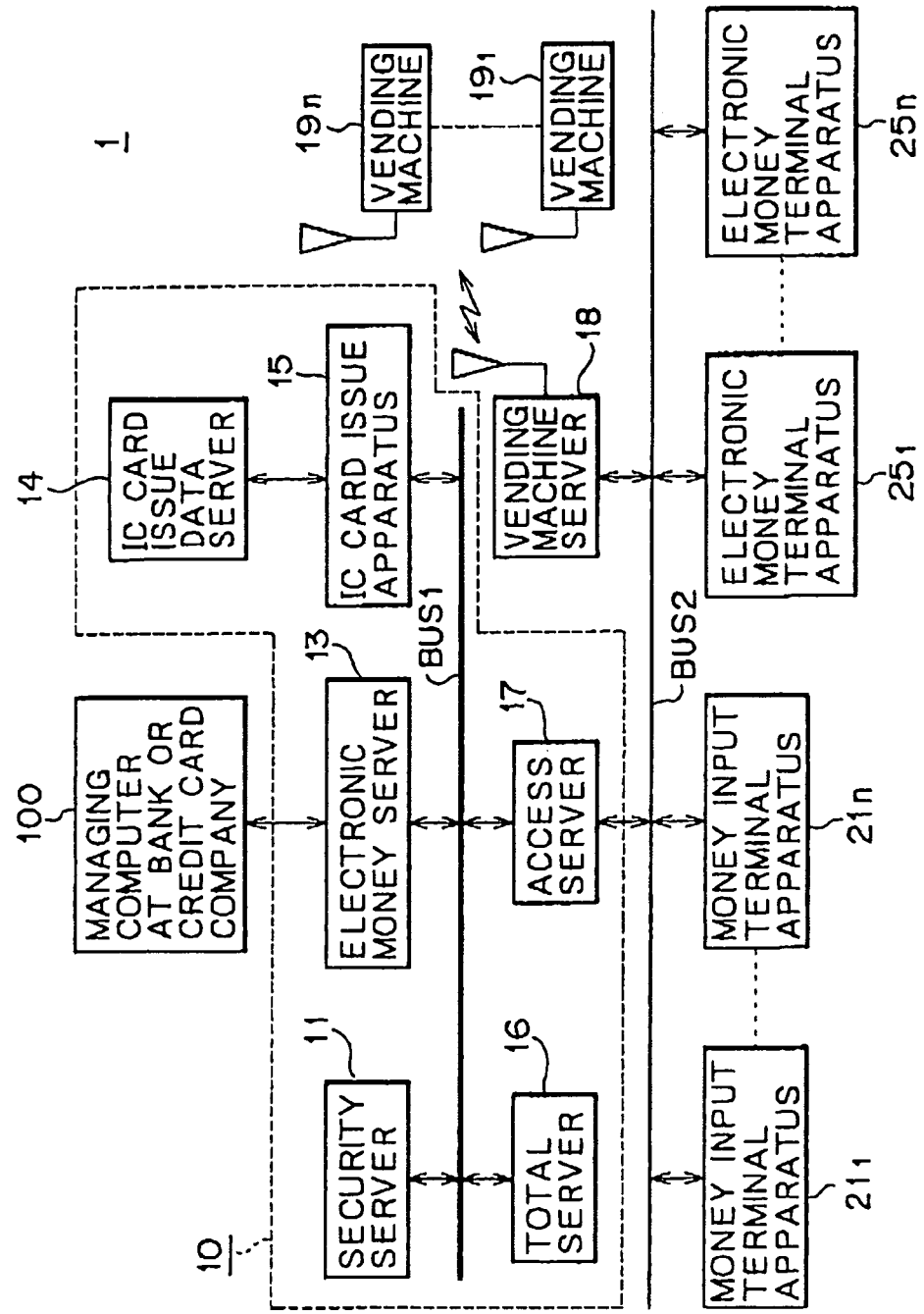
FIG. 2 is a block diagram illustrating a configuration of an electronic money-managing section.

Referring to FIG. 2, in the electronic money-managing section 10, a data bus BUS1 constituting a first LAN (Local Area Network) is connected to various servers (a security server 11, an electronic money server 13, an IC card issue data server 14, an IC card issue apparatus 15, a total server 16, an access server 17, and the vending machine server 18). A second data bus BUS2 constituting a second LAN is connected to various terminal apparatuses (money input terminal apparatuses $21_1$ through $21_n$, electronic money terminal apparatuses $25_1$ through $25_n$, and vending machines $19_1$ through $19_n$). The first LAN and the second LAN are interconnected through the access server 17.

Figure 3:
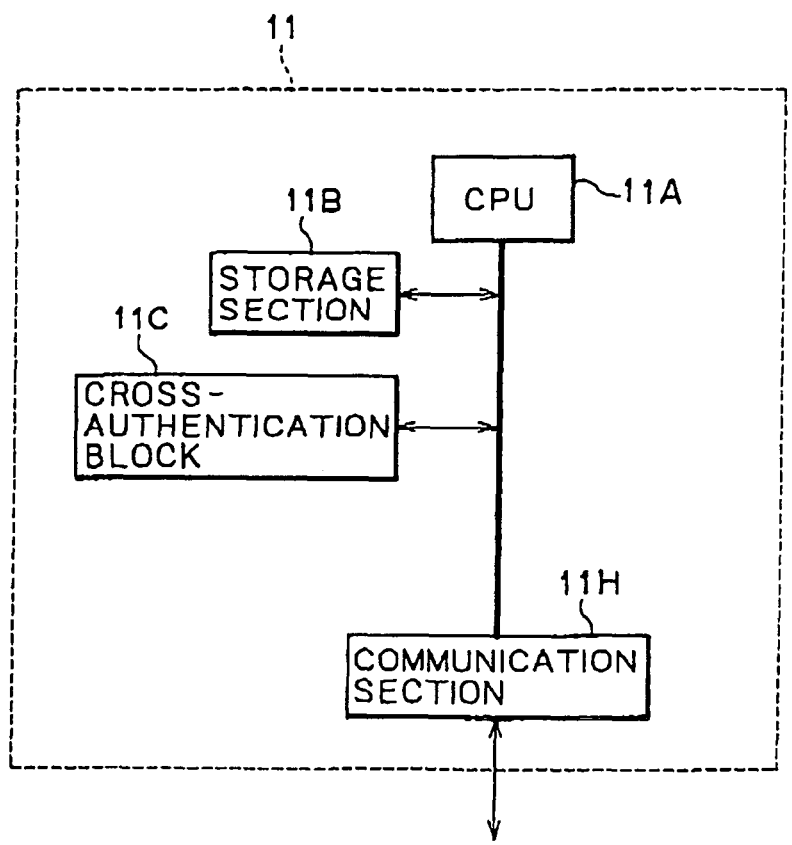
FIG. 3 is a block diagram illustrating a configuration of a security server.

In the electronic money-managing section 10, as shown in FIG. 3, the security server 11 has a CPU (Central Processing Unit) 11A that operates as instructed by an operating program stored in a storage section 11B. The CPU 11A captures, through a communication section 11H, data transferred between the total server 16 and other terminal apparatuses or servers and executes encryption by use of a predetermined encryption key and cross-authentication with the destination of communication through a cross-authentication section 11C.

Figure 4:
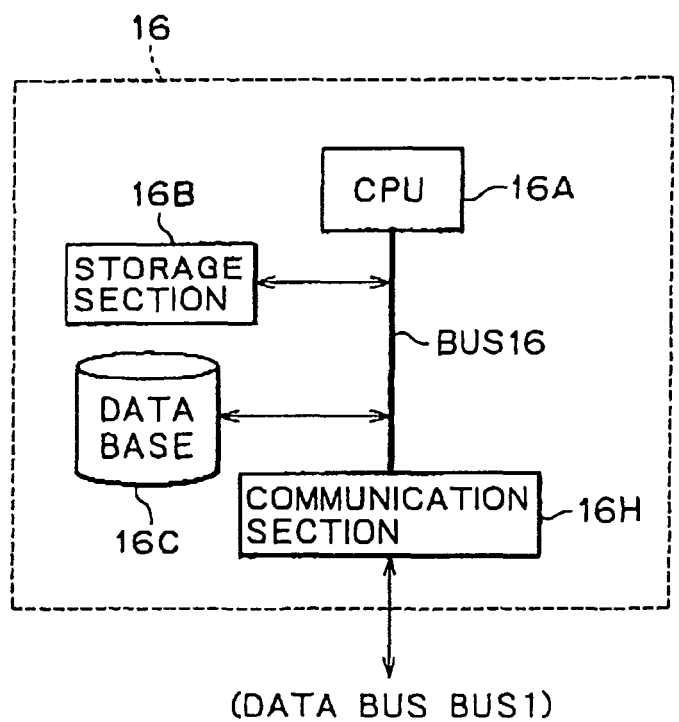
FIG. 4 is a block diagram illustrating a configuration of a total server.

Referring to FIG. 4, the total server has a CPU 16A that operates as instructed by an operating program stored in a storage section 16B. The CPU 16A captures the transaction log information such as the data of amount of money deposited through the money input terminal apparatuses $21_1$ through $21_n$ and the usage log of the IC card 50 accumulated in the electronic money terminal devices $25_1$ through $25_n$ (for example, IC card number, amount used, and date and time of use) from the communication section 16H through the second LAN, the access server 17, the first LAN, and the security server 11, and stores these pieces of information into a database 16C via a data bus BUS16.

Also, the total server 16 is adapted to store the data of the amount paid from a user-specified bank account supplied from the managing computer 100 of bank or credit card company into the database 16C via the electronic money server 13.

The electronic money server 13 transfers data to the managing computer 100 of a bank or credit card company through a predetermined communication line and, at the same time, on the basis of various information associated with the electronic money stored in the database 16C of the total server 16, executes periodically account settlement, for example, once a month.

The IC card issue data server 14 registers beforehand, in the database, the combination of the number of the IC card 50 issued by the IC card issue apparatus 15 and the credit card number of the user owning that IC card 50.

The vending machine server 18 accumulates the usage log (for example, amount used and date and time of use) of the IC card 50 sent from vending machines $19_1$ through $19_n$. Then, the vending machine server 18 stores periodically the accumulated usage log in the database 16C of the total server 16 through the second LAN, the access server 17, the first LAN, and the security server 11, for example, once a day.

In this electronic money system 1, the IC card issue apparatus 15 of the electronic money-managing section 10 issues IC cards 50 on which information can be read and written in a non-contact manner. The issued IC cards 50 are then distributed to users through the issue window 2 (refer to FIG. 1) of each tenant. The IC card 50 incorporates a memory in which an IC card number unique to each IC card 50 is stored.

Figure 5:
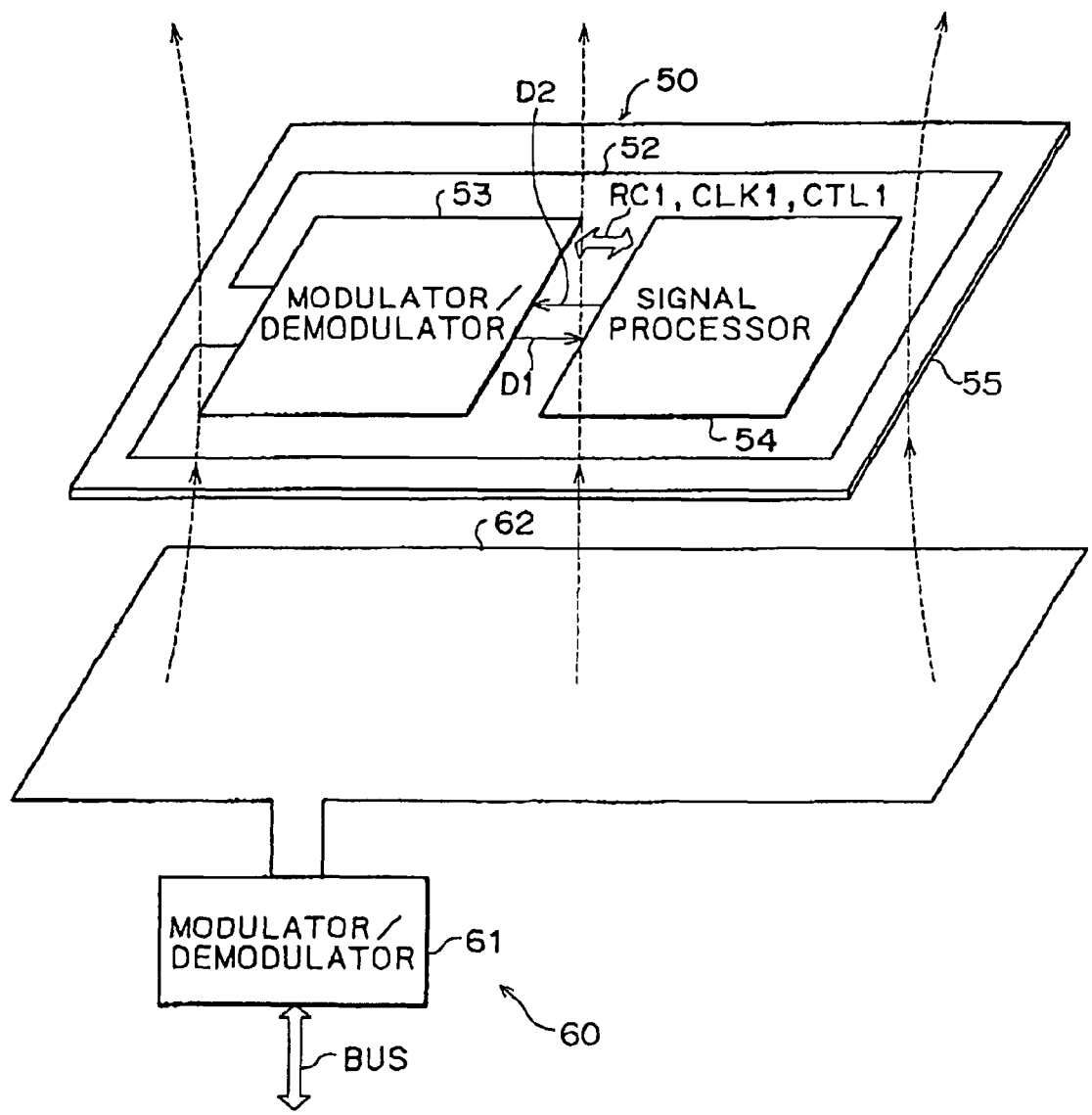
FIG. 5 is a schematic perspective view illustrating a configuration of an information card.

To be more specific, as shown in FIGS. 5 and 6, the IC card 50 is an IC card having no power supply battery. The IC card 50 comprises a flat base plate 55, a coil loop antenna 52 for receiving an electromagnetic wave radiated from a data read/write unit 60 and converting the received electromagnetic wave into an electrical signal, a modulator/demodulator 53 for modulating send data and demodulating receive data, and a signal processor 54 for analyzing receive data and generating send data.

In the IC card 50, the electromagnetic wave radiated from the data read/write unit 60 is received by the loop antenna 52, and the received electromagnetic wave is sent to the modulator/demodulator 53 as a modulated wave. The modulator/demodulator 53 demodulates the modulated wave and supplies the demodulated wave to the signal processor 54 as send data D1 supplied from the data read/write unit 60.

The signal processor 54 comprises a controller 59 based on a hard logic circuit or a CPU, a memory section composed of a ROM (Read Only Memory) 57, and a RAM (Random Access Memory) 58. As instructed by a program written to the ROM 57, the controller 59 analyzes the send data D1 in the RAM 58 and, on the basis of the analyzed send data D1, reads various data D2 associated with electronic money from the RAM 58 and sends the data D2 to the modulator/demodulator 53. The modulator/demodulator 53 modulates the data D2 and radiates the demodulated data D2 from the loop antenna 52 (refer to FIG. 5) to the data read/write unit 60 as an electromagnetic wave.

The modulator/demodulator 53 incorporates a power supply circuit for converting the electromagnetic wave energy into a stabilized direct current power. On the basis of the electromagnetic wave radiated from the data read/write unit 60 and received by the loop antenna 52, the modulator/demodulator 53 generates a direct current power DC1 through the incorporated power supply circuit and supplies the generated DC1 to the controller 59. At the same time, the modulator/demodulator 53 supplies a clock signal CLK1 generated on the basis of the received electromagnetic wave and receives a control signal CTL1 from the signal processor 54.

The data read/write unit 60 inputs various send data supplied over the data bus BUS into a modulator/demodulator 61. The modulator/demodulator 61 performs modulation processing on the basis of the send data by use of a carrier having a predetermined frequency band in which the send data can be radiated efficiently as an electromagnetic wave and radiates the modulated send data from a loop antenna 62 as an electromagnetic wave.

In addition, the data read/write unit 60 receives by the loop antenna 62 the electromagnetic wave radiated from the IC card 50 and supplies the received electromagnetic wave to the modulator/demodulator 61 as a modulated wave. The modulator/demodulator 61 demodulates the modulated wave and supplies the demodulated wave to a signal processor (not shown) through the data bus BUS as the data supplied from the IC card 50.

Figure 7A:
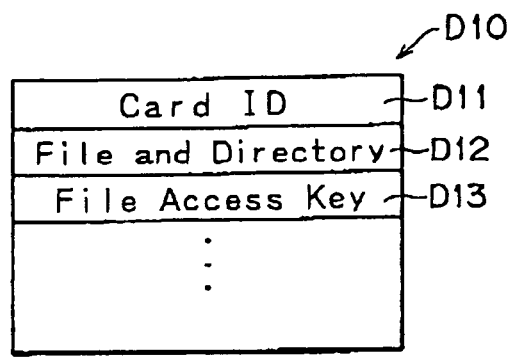
FIGS. 7A and 7B are diagrams illustrating data to be written to the information card.
Figure 7B:
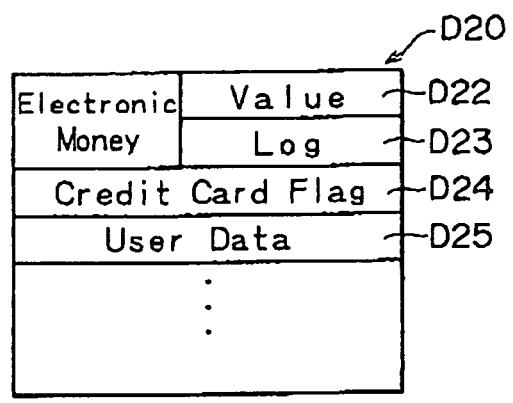

The RAM 58 of the IC card 50 is adapted to store various pieces of information associated with electronic money. These pieces of information are stored in plural files managed by a directory. To be more specific, the RAM 58 of the IC card 50 stores IC card number D11, file and directory definition information D12, and file access key D13, which are the upper information in the directory structure as shown in FIG. 7A. As the lower information in the direction structure, the RAM 58 stores electronic money information D20 as shown in FIG. 7B. The electronic money information D20 includes balance data D22 indicative of the balance of electronic money, electronic money-log data D23 indicative of electronic money usage log, a credit card use flag (to be described) D24 which registers at distribution of the IC card 50 whether, when the user does shopping by use of the IC card 50 and the balance data 22 is running short, the shortage may be paid by the credit card, and user-associated information (for example, employee number and office access timings) D25.

Figure 8:
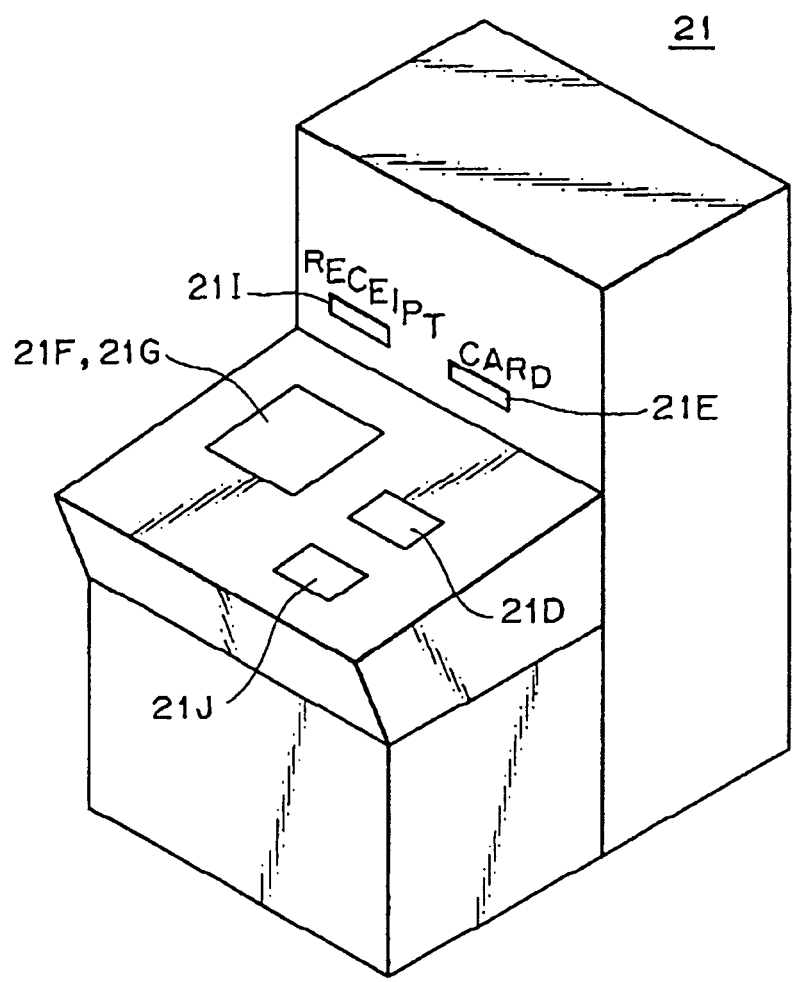
FIG. 8 is an external perspective view illustrating a money input terminal apparatus.

The user issued IC card 50 described above inputs amount of money data (namely, electronic money) substituting a desired amount of cash into the IC card 50 through the money input terminal apparatus $21_x$ shown in FIG. 1 by use of cash, a cash card, or a credit card. The money input terminal $21_x$ has on its external surfaces a card communication section 21D (generally the same in configuration as the loop antenna 62 and the modulator/demodulator 61 shown in FIG. 5) for transferring data with the IC card 50 in a non-contact manner, a credit card communication section 21E for reading data from the magnetic strips on a cash card or credit card 40, a cash drop section 21J through which cash is dropped, a touch panel composed of a display section 21F and an operator section 21G, and a receipt eject section 21I from which a receipt, namely a usage memo slip, is supplied to the user, as shown in FIG. 8.

There are two methods in which the user inputs amount of money data (namely, electronic money) into the IC card 50 through the money input terminal apparatus $21_x$. In one method, the user drops cash into the cash drop section 21J. Then the money input terminal apparatus $21_x$ writes the amount of money data equivalent to the dropped cash into the RAM 58 of the IC card 50. In the other method, the user inserts a cash card issued by a bank or a credit card issued by a credit card company, for example, into the credit card communication section 21E and specifies a desired amount of money through the operator section 21G. Then the money input terminal apparatus $21_x$ shifts the specified amount of money data from a specified account of the cash card or credit card to the IC card 50. It should be noted that the cash card herein denotes a card for using the deposit in one's bank account and the credit card denotes a card for the credit card company that issues the card to finance a predetermined amount of money to the user.

Figure 9:
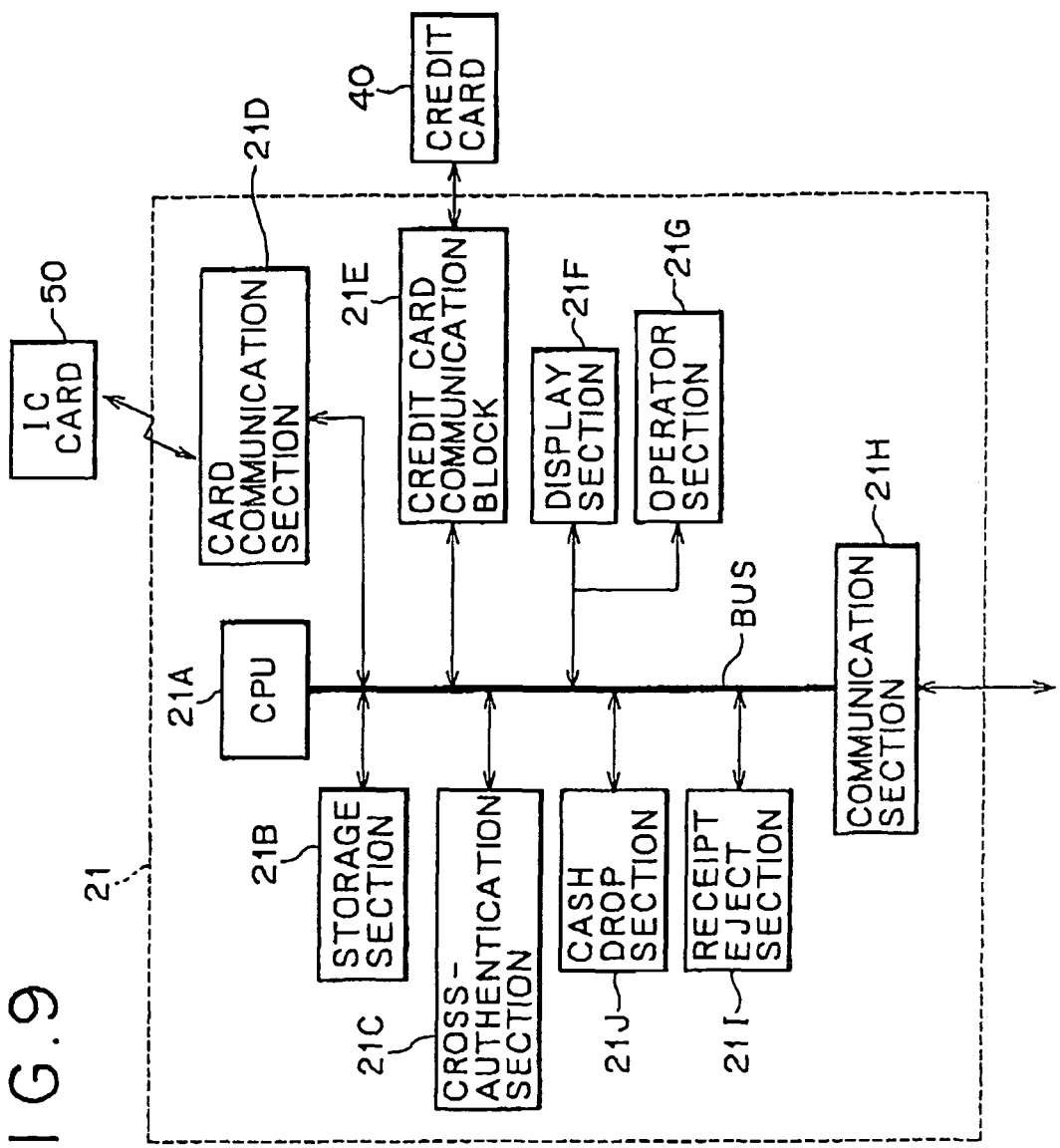
FIG. 9 is a block diagram illustrating a configuration of the money input terminal apparatus.
Figure 10:
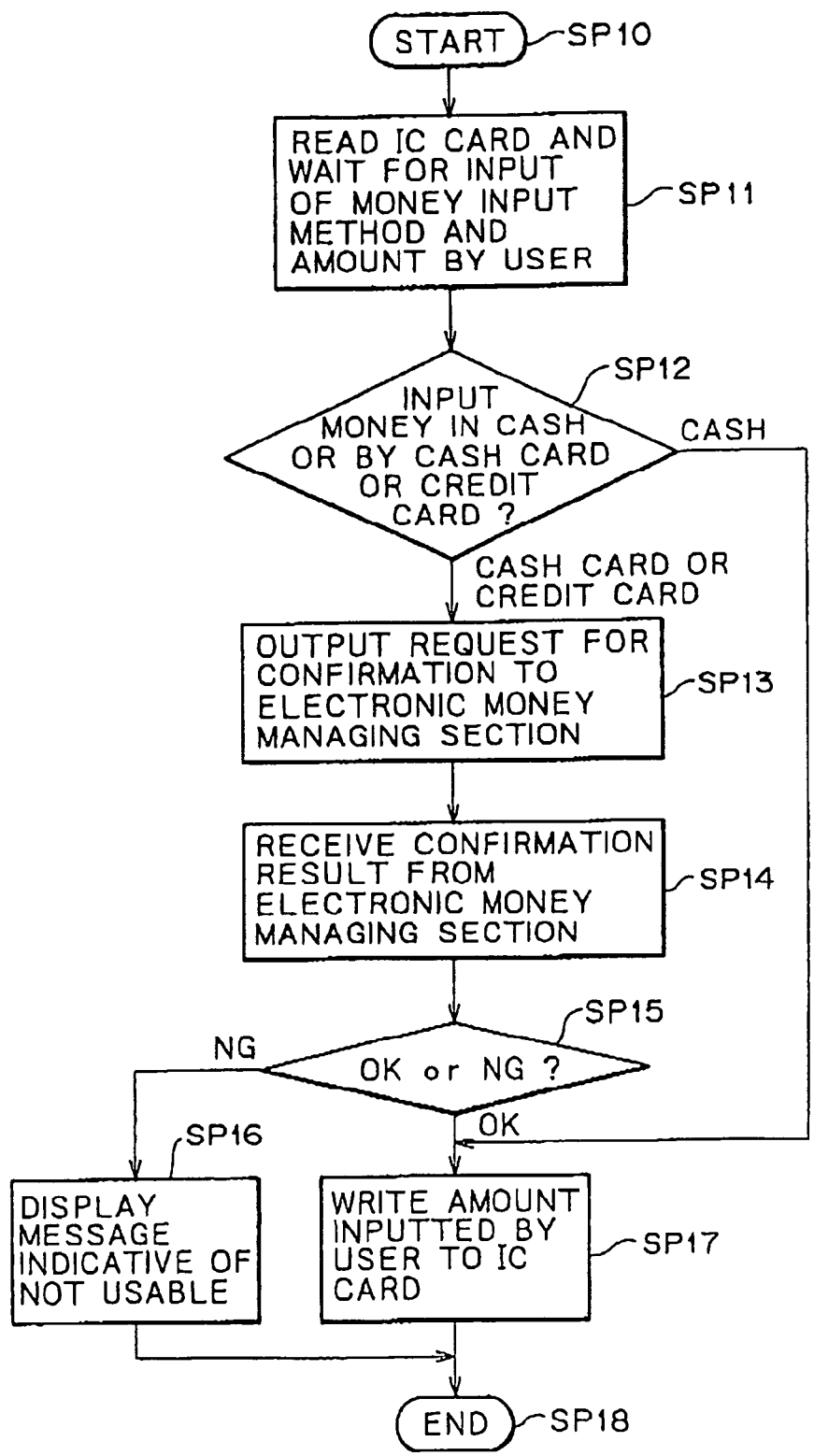
FIG. 10 is a flowchart describing a money input processing procedure in the money input terminal apparatus.

Referring to FIG. 9, in the money input terminal apparatus $21_x$, a CPU 21A is adapted to execute the money input processing procedure shown in FIG. 10, as instructed by a program stored in a storage section 21B. When the user loads the IC card 50 into the card communication section 21D and executes a money input operation through the operator section 21G, the CPU 21A enters the money input processing procedure from at SP10 shown in FIG. 10; and, in step SP11 reads the information such as the card number from the IC card 50, and waits for the user to input the money input method through the operator section 21G.

When the user specifies the method of money input in cash, the CPU 21A opens the cover of the cash drop section 21J and waits for the user to drop cash. When the user drops cash into the cash drop section 21J, the CPU 21A counts the dropped cash.

On the other hand, if the user specifies the method of money input by cash card or credit card 40, the CPU 21A displays a message on the display section 21 prompting the user to insert the cash card or credit card 40 into the credit card communication section 21E and enter an amount to be inputted. In response, the user enters a desired amount of money through the operator section 21G.

If the method of money input in cash is specified by the user, the CPU 21A goes from step SP12 to step SP17, the amount of cash dropped by the user into the cash drop section 21J to the IC card 50 through the card communication section 21D, and sends the amount of money data equivalent to the dropped cash to the total server 16 of the electronic money-managing section 10 through a communication section 21H, and stores the amount of money data in the total server 16. Then controller 59 of the IC card 50 adds the amount of money data supplied from the money input terminal apparatus $21_x$ to the balance of the electronic money stored on the RAM 58, thereby updating the balance data D22 (refer to FIG. 7B) indicative of the balance of the electronic money.

On the other hand, if the user specifies the method by which the cash card or credit card 40 is used for inputting money, the CPU 21A goes from step SP12 to step SP13 and reads the credit card number from the magnetic strips on the cash card or credit card 40 loaded in the credit card communication section 21E and sends this credit card number, the password of the cash card or credit card 40 inputted by the user through the operator section 21G, a request for use of the cash card or credit card 40, and an amount of money to use to the electronic money-managing section 10 (refer to FIG. 1) through the communication section 21H. At this moment, a cross-authentication section 21C of the money input terminal apparatus $21_x$ cross-authenticates the destination with which the CPU 21A communicates.

Then, the electronic managing section 10 sends the credit card number, the user inputted password, the request for use, and the amount to use supplied from the money input terminal apparatus $21_x$ to the managing computer 100 of the bank or credit card company managing the cash card or the credit card through the communication line.

The managing computer 100 of the bank or credit card company manages the cash card number or the credit card number and the authorized password of each cash card or credit card. If the combination of the credit card number and the user-inputted password supplied from the electronic money-managing section 10 is found an authorized combination, the managing computer 100 accepts the request for using the credit card.

Then, the managing computer 100 checks the balance of the account specified by the cash card number or the credit card number supplied from the electronic money-managing section 10 and determines whether the cash card or credit card 40 is usable on the basis of its expiration date and loss report, for example.

If the specified amount of money is found less than the balance of the account and the cash card or credit card 40 is found usable, the managing computer 100 approves the use of the specified amount and returns information thereon to the electronic money-managing section 10 and, at the same time, shifts the specified amount from the specified account to the total server 16 of the electronic money-managing section 10. On the other hand, if the specified amount is found exceeding the balance of the specified account or the use of the cash card or credit card 40 is not approved due to its expiration or loss report, for example, the managing computer 100 does not approve the use of the specified amount and returns information thereon to the electronic money-managing section 10.

The electronic money-managing section 10 sends the result of approval decision to the money input terminal apparatus $21_x$. The CPU 21A of the money input terminal apparatus $21_x$ receives the approval decision result through the communication section 21H in step SP14 (refer to FIG. 10).

If the received approval decision is found approval, the CPU 21A goes from step SP15 to step SP17 to send the user-specified amount to the IC card 50. The controller 59 of the IC card 50 adds the input amount data received from the money input terminal apparatus $21_x$ to the electronic money balance stored in the RAM 58 to update the balance data D22 (refer to FIG. 7B) indicative of the balance of that electronic money.

Then, the CPU 21A outputs a receipt printed with the contents of the transaction from the receipt eject section 21I, the ending the money input processing procedure in step SP18.

If the approval decision received in step SP14 is found disapproval, the CPU 21A goes from step SP15 to step SP16 to display on the display section 21F that the cash card or credit card 40 inserted by the user into the credit card communication section 21E has been rejected, thereby ending the money input processing procedure in step SP18.

Thus, when the amount of money data (namely, the electronic money) specified by the user are inputted in the form of cash into the IC card 50, the inputted amount of money data are sent from the money input terminal apparatus $21_x$ to the total server 16 of the electronic money managing section 10 and stored in the total server 16. When the amount of money data (the electronic money) specified by the user are inputted by use of the cash card or credit card 40 into the IC card 50, the managing computer 100 of the bank or credit card company sends the amount of money data equivalent to the amount of money data (the electronic money) inputted in the IC card 50 from the account specified by the cash card or credit card 40 to the electronic money-managing section 10, the equivalent amount of money data being stored in the total server 16.

Consequently, the total server 16 of the electronic money-managing section 10 holds the amount of money data equivalent to the amount of the electronic money (including those inputted in cash and by use of a cash card or a credit card) inputted to the IC card 50.

Thus, the IC card 50 contains the user-specified amount of money data (the electronic money) inputted in cash or by use of a cash card or a credit card, for example. Then, the user can use this IC card 50 for shopping.

Each store has the electronic money terminal apparatus $25_x$ ($25_1$ to $25_n$) connected to a POS (Point On Sale) register terminal, for example. As shown in FIG. 11, the electronic money terminal apparatus $25_x$ comprises a main body 25J, operated by a salesperson of the store, and an IC card read/write section 25K for transferring data with the IC card 50 in a non-contact manner when the IC card 50 is brought close to the IC card read/write section 25K by the user of the IC card 50.

The main body 25J is externally arranged with a touch panel with the display section 25F and the operator section 25G integrated. The operator section 25G has keys $25G_1$ for the four basic arithmetic operations, function keys $25G_2$, and keys for monetary amounts, for example, a 100-yen key $25G_3$, and a 1,000-yen key $25G_4$. Prices of articles frequently purchased can be preset to the function keys $25G_2$. A salesperson of the store operating the operator section 25J can operate the function keys $25G_2$ and the four basic arithmetic operations keys $25G_1$, like "F1×3+F2×2" for example, to easily input the prices of money purchased articles. It should be noted that the 100-yen key $25G_3$ and the 1,000-yen key $25G_4$ are used when a salesperson of the store inputs prices by use of the numeric keys of the four basic arithmetic keys $25G_1$.

The IC card read/write section 25K is also externally arranged with a card communication section 21D (generally the same in configuration with the loop antenna 62 and the modulator/demodulator 61 shown in FIG. 5) for transferring data with the IC card 50 in a non-contact manner and a display section 25L on which the contents of transaction are displayed. The electronic money terminal apparatus $25_x$ is adapted to determine that the user of the IC card 50 intends to use it (namely, the user intends to purchase something) when the user brings the IC card 50 close to the IC card read/write section 25K of the electronic money terminal apparatus $25_x$.

The display section 25L has a sales amount display section $25L_1$ for displaying the sales amount inputted by a salesperson of the store through the operator section 25G of the main body 25J, a shortage display section $25L_2$ for displaying a shortage when the balance in the IC card 50 is running short, and a balance display section $25L_3$ for displaying the balance of the electronic money in the IC card 50 after it is used.

Figure 12:
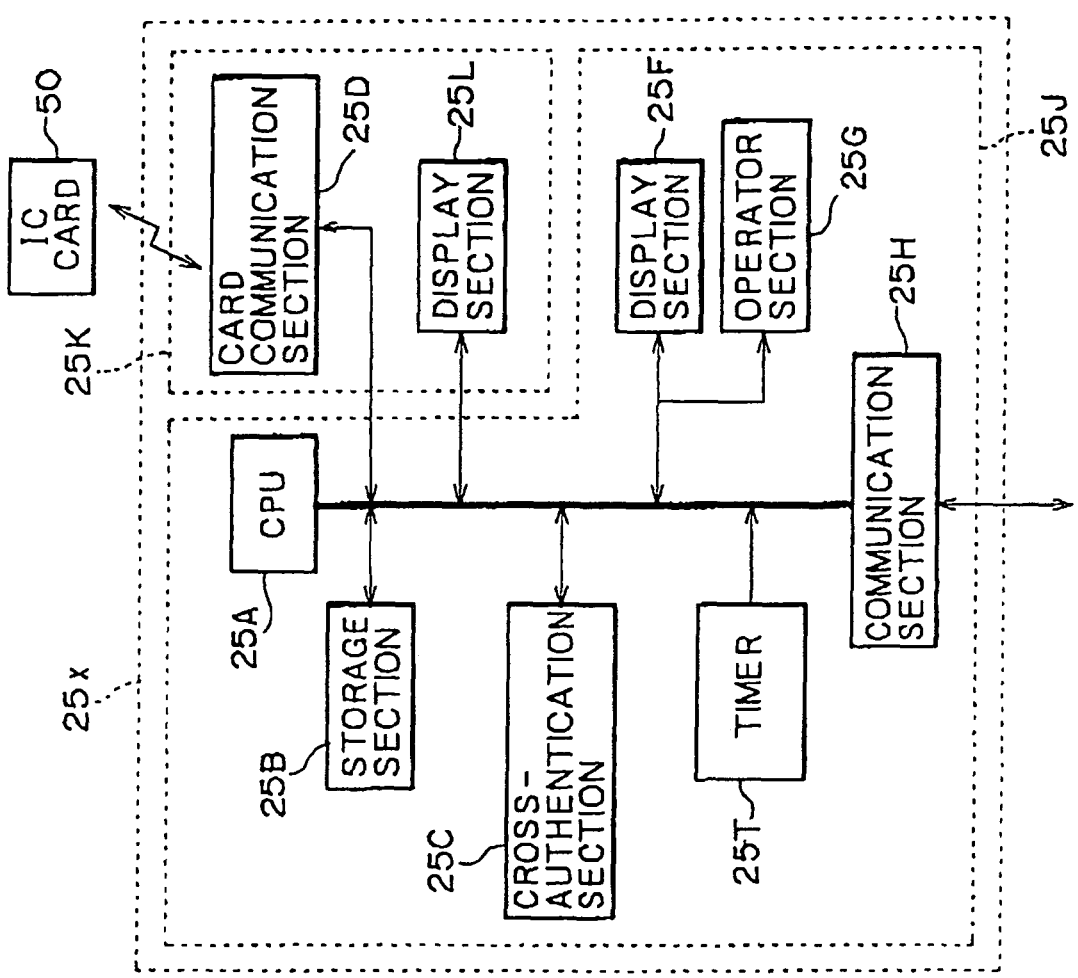
FIG. 12 is a block diagram illustrating a configuration of the electronic money terminal apparatus.
Figure 13:
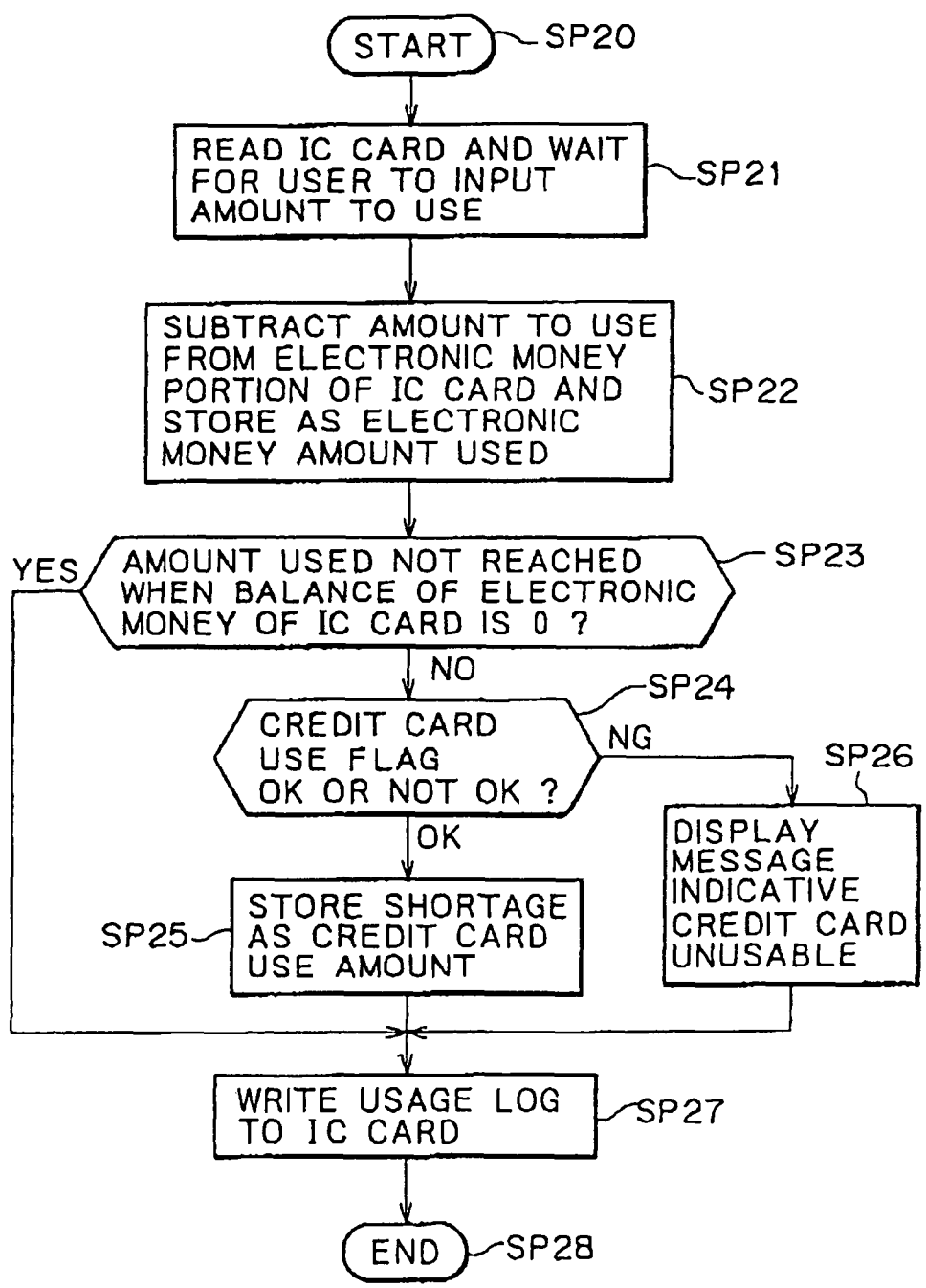
FIG. 13 is a flowchart describing an information card usage procedure in the electronic money terminal apparatus.

Referring to FIG. 12, in the electronic money terminal apparatus $25_x$, the CPU 25A of the electronic money terminal apparatus $25_x$ is adapted to execute the IC card-use procedure shown in FIG. 13, as instructed by a program stored in a storage section 25B. When the user brings the IC card 50 close to a card communication section 25D of the IC card read/write section 25K and a salesperson of the store operates the operator section 25G of the main body 25J to start a transaction, the CPU 25A starts the IC card use procedure from step SP20 shown in FIG. 13. In step SP11, the CPU 25A reads information, such as the card number from the IC card 50, and waits for the salesperson to enter a sales amount through the operator section 25G.

When the salesperson enters the sales amount through the operator section 25G, the CPU 25A goes to step SP22 to subtract the sales amount, namely the amount of the electronic money used, from the balance data D22 (refer to FIG. 7B) stored in the RAM 58 of the IC card 50 and stores that sales amount into an electronic money-use amount area of the storage section 25B of the electronic money-terminal apparatus $25_x$ along with the card number and the date and time of use. It should be noted that the date and time of use are detected by a timer 25T arranged in the main body 25J.

If the amount to be used is higher than the balance of the electronic money stored in the IC card 50, the CPU 25A makes displays on the display section 25F and the shortage display section $25L_2$ and goes from step SP23 to step SP 24. The CPU 25A reads the credit card use flag (refer to FIG. 7B) stored in the IC card 50 and, if the credit card is found usable, goes to step SP25 to store the shortage as a credit card use amount into the credit card use amount storage area of the storage section of the electronic money terminal apparatus 25.

The amount captured from the balance stored in the IC card 50 is stored in the storage section 25B of the electronic money-terminal apparatus $25_x$ as the electronic money-use information along with the card number of the IC card 50 and the date and time of use. The amount used as a credit card use amount is stored in the storage section 25B of the electronic money-terminal apparatus $25_x$ as credit card use information along with the card number of the IC card 50 and the date and time of use.

It should be noted that, when distributing the IC cards 50 to users, the credit card number of the usable credit card issued by the credit card company used by the user and the card number of the IC card 50 delivered to that user are stored in the IC card-issue data server 14 (refer to FIG. 2) of the electronic money-managing section 10 and, at the same time, the credit card use flag D24 (refer to FIG. 7B) in the RAM 58 of the IC card 50 is put in the usable state. Then, the electronic money-managing section 10 inquires at predetermined intervals of the credit card company by the number of that credit card if the same is usable on the basis of its expiration date, payment delay, and theft or loss report, for example.

If that credit card is found not usable, the electronic money-managing section 10 sends the information on the card number of the IC card 50 in which the number of the unusable credit card is registered and the credit card is unusable to each electronic money terminal apparatus $25_x$ ($25_1$ to $25_n$). Consequently, if that IC card 50 is used, the CPU 25A of the electronic money-terminal apparatus 25 does not allocate the shortage of the electronic money as an amount of credit card use but displays the shortage on the display section 25F and the display section 25L. At the same time, the CPU 25A puts the credit card use flag in the memory of that IC card 50 into the unusable state.

When the credit card use flag set in the memory of IC card 50 is put in the unusable state, each electronic money terminal apparatus $25_x$ ($25_1$ to $25_n$) uses only the electronic money previously inputted in that IC card 50. Therefore, in this case, the CPU 25A of the electronic money terminal apparatus 25 goes from step SP24 to step SP26 shown in FIG. 13 to display on the display section 25F and the display section 25L that the credit card is unusable.

When the sequence of the processing operations associated with the use of the IC card 50 has been completed, the CPU 25A of the electronic money-terminal apparatus 25 goes to step SP27 to write the log of the use made this time to the RAM 58 of the IC card 50 as electronic money-log data D23 (refer to FIG. 7B), thus ending the IC card-use procedure in step SP28.

Consequently, the storage section 25B of the electronic money-terminal apparatus 25 separately stores, as the usage log of the IC card 50, the amount used of the electronic money previously stored in the IC card 50 and the amount of the credit card used when the electronic money runs short. It should be noted that, at this time, the date and time of use and the IC card number are stored in the storage section 25B as usage log information along with the amounts used.

In the electronic money-log data D23 (refer to FIG. 7B) written to the RAM 58 of the IC card 50, 32-byte data consisting of 12 items constitute one usage log block, as shown in FIG. 14A. The past 15 usage log blocks are cyclically written.

Each usage log block has communication identification information $D23_1$ for identifying by the IC card 50 the communication at which the use of electronic money is written to this block, log type information $D23_2$ indicative of the use form of the electronic money in this usage log (a use form indicating whether the electronic money has been deposited or withdrawn and a type indicating whether the use of the electronic money has been made from its balance or the shortage has been made up for by the use of a credit card), use date and time information $D23_3$, terminal number information $D23_4$ indicative of the number of the electronic money terminal apparatus $25_x$ used, transaction (used) amount information $D23_5$ in this usage log, key version information $D23_6$ indicative of the version of an encryption key for the communication data for using the IC card 50, post-use balance information $D23_7$ indicative of the balance of the electronic money stored in the IC card 50 after the transaction (use), communication identification information $D23_8$ for the electronic money terminal apparatus $25_x$ for identifying the communication in the communication between the electronic money terminal apparatus $25_x$ and the IC card 50 at that transaction (use), and signature information $D23_9$ represented by the key specified by the above-mentioned key version information $D23_6$.

Thus, the controller 59 of the IC card 50 forms the electronic money-log data D23 consisting of one usage log block (refer to FIG. 14A) for each use of the electronic money. The unit of use (the usage log) in this case is different between the use form in which the electronic money stored in the IC card 50 is used and the use form in which the shortage is made up for by the credit card. For each of these use forms, a separate usage log block is formed.

The electronic money-log data D23 formed every time the IC card 50 is used are written to the RAM 58 of the IC card 50 in step SP28 shown in FIG. 13. At the same time, the electronic money-log data D23 are accumulated in the storage section 25B of the electronic money terminal apparatus 25 in step SP22 and step SP25 shown in FIG. 13.

In this case, the CPU 25A of the electronic money-terminal apparatus 25 adds card identification information D23A for identifying the IC card 50 shown in FIG. 14B to the electronic money-log data D23 (refer to FIG. 14A) and writes the resultant data to the storage section 25B.

To be more specific, the card identification information D23A includes IC card number $D23A_1$ indicative of the IC card used in the electronic money-log data D23 to which the card identification information 23A is added, transaction terminal flag $D23A_2$ indicative of whether the electronic money terminal apparatus $25_x$ to which the electronic money data D23 are written is the same electronic money terminal apparatus $25_x$ at the time of the use of the card for which the electronic log data D23 were formed, key version information $D23A_3$ indicative of the version of an encryption key for the communication data in writing the electronic money-log data D23 to the electronic money terminal apparatus $25_x$, and signature information $D23A_4$ represented by use of the key specified by the key version information $D23A_3$.

It should be noted that CPU 25A of the electronic money-terminal apparatus $25_x$ writes the electronic money-log data D23 to the RAM 58 of the IC card 50 when the data is created at the use of the card and, at the same time, adds the card identification information D23A to the electronic money-log data D23 along with the card identification information D23A to write the resultant data to the storage section 25B of the electronic money-terminal apparatus $25_x$. The electronic money-log data D23 written to the IC card 50 are accumulated in the IC card 50 for 15 times of past use. These electronic money-log data D23 are written every time the IC card 50 is used to the electronic money terminal apparatus $25_x$ on which the IC card 50 has been used.

Therefore, every time the IC card 50 is used, the electronic money-terminal apparatus $25_x$ is adapted to write the electronic money-log data D23 for the 15 times of past use written to the IC card 50 to the storage section 25B. If the terminal number information $D23_4$ of the past electronic money-log data D23 to be written indicates another electronic money terminal apparatus $25_x$, the transaction terminal flag $D23A_2$ of the card identification information D23A displays that the electronic money-log data D23 indicates a transaction made on another electronic money terminal apparatus $25_x$. This display is used when the electronic money-managing section 10 executes account settlement.

Thus, the amount of money, the card number, and the date and time information are accumulated every time the IC card 50 is used into the electronic-money terminal apparatus $25_x$ as a usage log(the electronic money-log data D23). The electronic money-managing section 10 captures the usage log of the IC card 50 accumulated in each electronic money-terminal apparatus $25_x$ ($25_1$ to $25_n$) once a day.

Then, the electronic money-managing section 10 collectively summarizes the credit card use information in the captured IC card usage log information (the electronic money-log data D23 and the card identification information D23A) supplied from each terminal apparatus $25_x$ ($25_1$ to $25_n$) at predetermined intervals for each IC card 50. The electronic money-managing section 10 sends the result of the summary along with the card number of the IC card 50 on the basis of the previously registered credit card number to the managing computer 100 of the bank or credit card company.

At this moment, the managing computer 100 withdraws the amount made up for by the credit card from the account of the user and sends this amount to the electronic money-managing section 10 for storage in the total server 16.

The amounts accumulated as credit card use amounts when the balance of the electronic money ran short when using the IC card 50 are collectively paid from the account of the user by the managing computer 100 and stored in the total server 16 of the electronic money-managing section 10.

Thus, if the balance of the electronic money runs short and, therefore, the shortage is made up for by the use of the credit card when using the IC card 10, the managing computer 100 of the bank or credit card company does not immediately withdraw the deficit-covering amount from the account of the user; but it later collectively withdraws the amounts. This allows the electronic money-managing section 10 to request the managing computer 100 of the bank or credit card company for the withdrawal of the amounts of many uses by one communication operation. Because no communication cost is incurred for each use of the IC card 50, the user can use the IC card 50 (namely the credit card) without being afraid of additional usage costs, even if the amount of use is small.

Then, the electronic money-managing section 10 executes an account settlement once a month for example on the basis of the usage log (the electronic money-log data D23 and the card identification information D23A) of the IC card 50 captured in the database 16C of the total server 16 from each terminal apparatus $25_x$ ($25_1$ to $25_n$) once a day.

Figure 15:
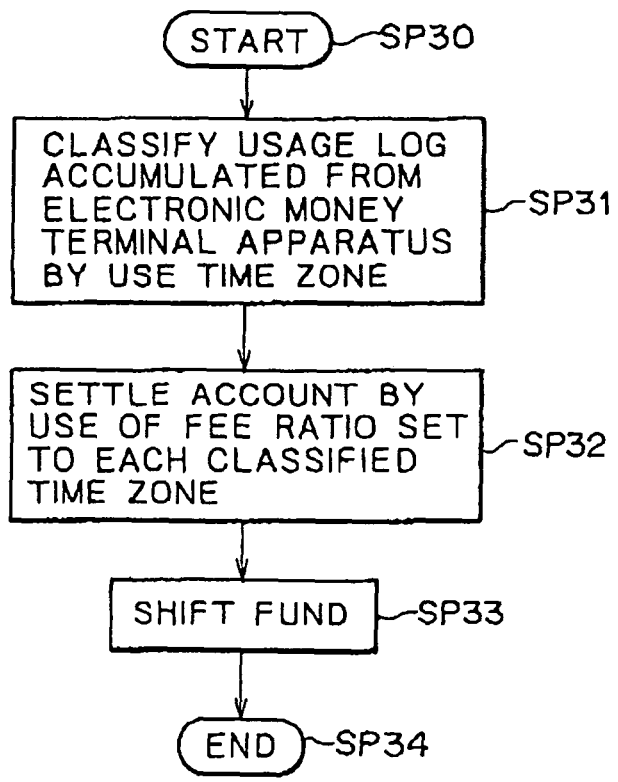
FIG. 15 is a flowchart describing a settlement processing procedure in the electronic money-managing section.

To be more specific, the electronic money server 13 of the electronic money-managing section 10 starts the settlement processing procedure from step SP30 shown in FIG. 15 according to a processing start instruction given by the total server 16. In step SP31, the electronic money server 13 classifies the usage log (the electronic money-log data D23 and the card identification information D23A) collected from the electronic money-terminal apparatus by use time zone on the basis of the use date and time information $D23_3$ (refer to FIG. 14A). It should be noted that the database 16C of the total server 16 stores the use fee of the electronic money system 1 for each store. Different fee rates are set for different time zones for sales amounts. In the present embodiment, the fee rate is 5% if the IC card 50 is used between 5 a.m. and 5 p.m. (a first time zone) and 7% between 5 p.m. and 5 a.m. (a second time zone).

Therefore, the electronic money server 13 settles the electronic money-log data D23 classified into the first time zone and the second time zone in step SP31, as shown in FIG. 15, by use of the fee rate of each time zone in step SP32.

Consequently, the electronic money server 13 executes account settlement by applying the use fee ratio of 5% for the use amount used in the first time zone and the use fee ratio of 7% for the use amount used in the second time zone.

The use fee of 5% is subtracted from the use amount used in the first time zone and the use fee of 7% is subtracted from the use amount used in the second time zone, the remains being the profit of each store. Then, the electronic money server 13 goes to step SP33 to take the profit amount corresponding to the result of the settlement processing out of the amount of money data accumulated in the database 16C of the total server 16 and transfer the profit amount into the account of each store. At this moment, the electronic money server 13 distributes a profit amount transfer statement to each store. This statement lists the details of use time zones and total data classified by use time zone.

Then, the electronic money server 13 ends this settlement processing in step SP34.

Thus, changing the electronic money use fee rates for each time zone can realize appropriate fee rates in accordance with the price settings of articles in each store. For example, a lower fee rate is set during daytime in which articles of relatively low prices sell well, while a higher fee rate is set during nighttime in which articles of relatively high prices sell well.

(2) Operations and Effects of the Embodiment

In the above-mentioned configuration, the electronic money-terminal apparatus $25_x$ describes each use time of the IC card 50 to the usage log (the electronic money-log data D23). The electronic money server 13 that summarizes this usage log collected into the total server 16 of the electronic money-managing section 10 at predetermined intervals computes the use fee of the use amount by applying the use fee rate for that time zone on the basis of the use fee rates by time zone stored in the database 16C of the total server 16.

Consequently, the use fee rates can be changed between the time zones in which articles of relatively low prices sell well and articles of relatively high prices sell well. As a result, even in a time zone in which articles of relatively low prices (namely, low-profit articles) sell well, the user can use the electronic money system 1 with a low use fee.

As described and according to the above-mentioned configuration, the user can use the electronic money system 1 regardless of the time zones for different profit rates. Consequently, the user owning the IC card 50 always may only pay by the IC card 50, which saves the cumbersome approval operation required if the credit card 40 is used, for example. This enhances the effectiveness of the IC card 50 that substitutes cash money.

(3) Other Embodiments

In the above-mentioned embodiment, the IC card 50 is used in two time zones; the first time zone between 5 a.m. and 5 p.m.; and, the second time zone between 5 p.m. to 5 a.m. It will be apparent to those skilled in the art that various other time zones may be allocated, and three or more time zones may be set.

In the above-mentioned embodiment, the use fee rates are changed according to the time zones in which the IC card 50 is used. It will be apparent to those skilled in the art that the use fee rates may be changed according to date, day of the week, or other factors.

In the above-mentioned embodiment, the use fee rates are 5% and 7% according to the time zones. It will be apparent to those skilled in the art that various other rates may be set.

In the above-mentioned embodiment, the electronic money-managing section 10 computes the use fee for each time zone on the basis of the usage log summarized from each electronic money terminal apparatus 25$_x$. It will be apparent to those skilled in the art that the usage log may be stored in the electronic money-terminal apparatus 25$_x$ for each preset time zone, and the usage log thus stored may be collected by the electronic money-managing section 10 as the usage log classified by time zone.

In the above-mentioned embodiment, the electronic money-managing section 10 computes the use fee for each time zone on the basis of the usage log collected from each electronic money-terminal apparatus 25$_x$. It will be apparent to those skilled in the art that the electronic money-managing section 10 may send the use fee rate for each preset time zone to each electronic money-terminal apparatus 25$_x$, which then computes the use fee accordingly.

In the above-mentioned embodiment, the IC card 50 is of non-contact type. It will be apparent to those skilled in the art that IC cards of contact type may be used.

In the above-mentioned embodiment, the IC card 50 is used for storing the amount of money data as electronic money. It will be apparent to those skilled in the art that a terminal apparatus may detect, through a predetermined timer means, a time at which a credit card is used and compute, through a computing means, a credit card use fee in accordance with the detected time.

In the above-mentioned embodiment, the use time of the IC card 50 is detected in the electronic money-terminal apparatus 25$_x$, and the detection results are summarized in the electronic money-managing section 10 once a day. It will be apparent to those skilled in the art that the use time of the IC card 50 may be detected likewise in the vending machine 19$_x$, and the detection results may be summarized by the electronic money-managing section 10 along with the usage log (the electronic money-log data). On the basis of the summarized result, use fees classified by time zone and so on may be computed.

In the above-mentioned embodiment, the usage log of the IC card 50 accumulated in each electronic money-terminal apparatus 25$_x$ is collectively captured in the electronic money-managing section 10 once a day, and the account settlement is executed by the electronic money-managing section 10 once a month. It will be apparent to those skilled in the art that the capture of the usage log and the account settlement may be executed at any other time intervals.

In the above-mentioned embodiment, the information card has a shape of a cash card or a credit card, for example. It will be apparent to those skilled in the art that the information card may also be contained in any portable electronic devices, such as a mobile telephone, a portable personal computer, or a watch.

In the above-mentioned embodiment, the information card is used as electronic money. It will be apparent to those skilled in the art that the information card may have not only the electronic money capability but also such capabilities as personal authentication, for example, an employee certificate (identification by matching registered personal information), an office access key (for example, means for permitting access to security office or room), a commuter pass, a driver's license, a passport, an insurance certificate, and a point discount card.

As described and according to the invention, the electronic money-use fee is computed on the basis of the information about the timing with which amount of money data equivalent to an amount of money used are withdrawn from an information card, thereby allowing the user owning the information card to use an electronic money system regardless of time zones having different profit rates. Consequently, the user owning the information card always may pay by the information card, thereby enhancing the effectiveness of the information card that substitutes cash money.

While the preferred embodiments of the present invention have been described using specific terms, such description is for illustrative purposes only, and it is to be understood that changes and variations may be made without departing from the spirit or scope of the appended claims.

What is claimed is:

1. An electronic money system comprising:
 a money input terminal through which amount of money data as electronic money are inputted into an information card;
 an electronic money terminal that captures amount of money data from the information card as a first use amount or a second use amount to complete transactions, and stores usage history of the information card based on data associated with the transactions; and
 an electronic money manager that collects and summarizes the usage history of the information card from the electronic money terminal at a first predetermined interval, and settles merchant accounts associated with the transactions at a second predetermined interval, wherein when the amount of money data is captured as the second use amount merchant accounts are settled in conjunction with a usage fee that corresponds to plural instances of the second use amount in the summarized usage history for the second predetermined interval, wherein the plural instances of the second use amount occurring for transactions during the second predetermined interval are accumulated and collectively settled in one communication operation that is initiated by the electronic money terminal at the second predetermined interval, and one corresponding instance of the usage fee,
 wherein the first use amount is a cash amount and the second use amount is a credit amount, and
 wherein when the captured first use amount fails to satisfy a transaction such that a balance remains, the electronic money manager captures the second use amount to satisfy the remaining balance provided that a credit use flag for the information card is set.

2. The electronic money system according to claim 1, wherein said information card is a non-contact type information card for transferring said amount of money data in a non-contact manner.

3. The electronic money system according to claim 1, wherein the merchant accounts are also settled according to an electronic money-use fee that is calculated on the basis of a plurality of different fee rates that are respectively determined based upon the time of day in which corresponding transactions occur.

4. A payment-accepting apparatus for accepting payment of an amount of money used in the form of money data corresponding to the amount of money used, comprising:
    means for reading data of the electronic money stored in an information card;
    means for withdrawing amount of money data for payment from the information card as a first use amount or a second use amount;
    means for summarizing and storing usage history which includes the amount of money data and information about the timing of the withdrawal; and
    means for transferring the stored usage history to an electronic money managing unit so as to carry out account settlement based on a total amount of money data withdrawn from the information card for withdrawals occurring over a predetermined interval, wherein the amount of money data withdrawn as the second use amount for the account settlement is settled in conjunction with a usage fee that corresponds to plural instances of the second use amount in the summarized usage history for the predetermined interval, wherein the plural instances of the second use amount occurring for withdrawals during the predetermined interval are accumulated and collectively settled in one communication operation and one corresponding instance of the usage fee,
    wherein the first use amount is a cash amount and the second use amount is a credit amount, and
    wherein when the withdrawed first use amount fails to satisfy the payment such that a balance remains, the means for withdrawing withdraws the second use amount to satisfy the remaining balance, provided that a credit use flag for the information card is set.

5. The payment accepting apparatus according to claim 4, wherein said payment accepting apparatus withdraws amount of money data equivalent to an amount of money used from amount of money data inputted in an information card as electronic money, thereby accepting a payment equivalent to said amount of money used in the form of said amount of money data.

6. The payment accepting apparatus according to claim 4, wherein timing information is associated with a time when the amount of money is withdrawn and a computing means computes a payment processing fee based on a plurality of different fee rates that are respectively determined based upon the time of day in which corresponding withdrawals occur.

7. The payment accepting apparatus according to claim 5, wherein said information card is a non-contact type information card for transferring said amount of money data in a non-contact manner, said payment accepting apparatus further comprising:
    a communication means for receiving said amount of money data from said information card in a non-contact manner.

8. An electronic money system comprising:
    a withdrawing means for withdrawing an amount of money as a first use amount or a second use amount from an electronic apparatus having an information storage section that stores a monetary value as a balance of electronic money;
    an electronic money terminal apparatus having a storage means for storing timing information that identifies a time the amount of money is withdrawn; and
    an electronic money managing means for summarizing said amount of money withdrawn from said electronic apparatus and the timing information at a predetermined intervals, wherein the amount of money data withdrawn as the second use amount for an account settlement is settled in conjunction with a usage fee that corresponds to plural instances of the second use amount in a summarized usage history for the predetermined interval, wherein the plural instances of the second use amount occurring for withdrawals during the predetermined interval are accumulated and collectively settled in one communication operation and one corresponding instance of the usage fee,
    wherein the first use amount is a cash amount and the second use amount is a credit amount, and
    wherein when the captured first use amount fails to satisfy the transaction such that a balance remains, the electronic money manager captures the second use amount to satisfy the remaining balance, provided that a credit use flag for the electronic apparatus is set.

9. The electronic money system according to claim 8, wherein said timing information is associated with a time when the amount of money is withdrawn and said electronic money managing means computes an electronic money use fee based upon the time of day in which corresponding withdrawals occur.

10. The electronic money system according to claim 8, wherein said electronic apparatus is a card-shaped storage medium.

11. The electronic money system according to claim 10, wherein said card-shaped storage medium is a non-contact type information card that transfers said amount of money in a non-contact manner.

12. The electronic money system according to claim 8, wherein said electronic apparatus is at least a communication terminal apparatus.

13. The electronic money system according to claim 8, wherein said electronic apparatus at least performs personal authentication.

14. A method of executing a transaction in an electronic money system using an information card which stores data of electronic money, comprising the steps of:
    storing electronic money data in the information card;
    withdrawing, by a processing unit, money data from the information card through an electronic money terminal as a first use amount or a second use amount to complete transactions;
    storing usage history that includes the amount of money data and the timing information of the withdrawal;
    withdrawing, by a processing unit, money data from the information card as the second use amount when the withdrawn first use amount fails to satisfy a transaction such that a balance remains, wherein the first use amount is a cash amount and the second use amount is a credit amount, provided that a credit use flag for the information card is set; and
    collecting and summarizing, but a processing unit, the usage history of the information card from the electronic money terminal at a first predetermined interval, and settling merchant accounts associated with the transaction at a second predetermined interval, wherein when the amount of money data is withdrawn as the second use amount, merchant accounts are settled in conjunction with a usage fee that corresponds to plural instances of the second use amount in the summarized usage history for the second predetermined interval, wherein the plural instances of the second use amount occurring for transactions during the second predetermined interval are accumulated and collectively settled in one communication operation and one corresponding instance of the usage fee.

15. The method according to claim 14, wherein the merchant accounts are also settled according to an electronic money-use fee that is calculated outside the electronic money terminal on the basis of a plurality of different fee rates that are respectively determined based upon the time of day in which corresponding transactions occur.

16. The electronic money system of claim 1, wherein the usage history includes amount of money data and information identifying a time when the amount of money is withdrawn.

17. An electronic money system that executes a transaction, comprising:
   a transaction card that includes identification information, an electronic money value, and a credit flag;
   a money input terminal that transfers a cash value or a credit value to the transaction card as an electronic money value;
   a transaction terminal that reads the transaction card to capture at least the identification information and the electronic money value, subtracts a transaction balance of the transaction from the electronic money value to obtain a difference, and stores transaction information associated with the transaction as usage history for a series of transactions corresponding to the transaction card, wherein when the difference is a negative value and the credit flag of the transaction card is set, the difference is made up by available credit of the transaction card; and
   an electronic money manager that collects and summarizes the usage history of the transaction card for the series of transactions at a first predetermined time, settles accounts associated with the transaction card at a second predetermined time, wherein when the available credit of the transaction card is used, accounts are settled in conjunction with a usage fee that corresponds to plural instances of the credit value in the summarized usage history for the second predetermined time, such that the plural instances of the using credit for transactions during the second predetermined time are accumulated and collectively settled in one communication operation and one corresponding instance of the usage fee.

18. A method of executing an electronic sales transaction, comprising the steps of:
   Transferring, by a processing unit, at least one of a cash value and a credit value to a transaction card as an electronic money value;
   reading the transaction card to capture at least card identification information and the electronic money value;
   comparing, by a processing unit, a transaction balance to the electronic money value of the transaction card;
   determining, by a processing unit, whether the transaction card has available credit when the transaction balance is greater than the electronic money value;
   adding, by a processing unit, at least a portion of the available credit of the transaction card to a difference between the transaction balance and the electronic money value, provided that a credit use flag for the transaction card is set;
   storing transaction information associated with the transaction as usage history;
   summarizing the usage history for a series of transactions corresponding to the transaction card at a first predetermined time;
   determining a usage fee that corresponds to the summarized usage history of the transaction card for the series of transactions; and
   settling, by a processing unit, accounts associated with the transaction card at a second predetermined time, wherein when the available credit of the transaction card is used, accounts are settled in conjunction with the usage fee that corresponds to plural instances of the credit value in the summarized usage history for the second predetermined time, such that the plural instances of using available credit for transactions during the second predetermined time are accumulated and collectively settled in one communication operation and one corresponding instance of the usage fee.

19. An electronic money system according to claim 1, wherein the usage history of the information card based on data associated with the transactions stored by said electronic money terminal comprises a usage log, and wherein said usage log comprises a key version information indicative of the version of an encryption key that is used in communicating the money data from the information card to the electronic money terminal.

20. A payment-accepting apparatus according to claim 4, wherein the means for summarizing and storing usage history implements a usage log, and wherein said usage log comprises a key version information indicative of the version of an encryption key that is used in communicating the amount of money data from the information card to the payment-accepting apparatus.

21. An electronic money system according to claim 10, wherein the electronic money managing means implements a usage log, and wherein said usage log comprises a key version information indicative of the version of an encryption key that is used in communicating the amount of money data from the electronic apparatus to the electronic money system.

22. A method of executing a transaction according to claim 14, wherein collecting and summarizing the usage history implements a usage log, and wherein said usage log comprises a key version information indicative of the version of an encryption key that is used in communicating the money data from the information card to the electronic money terminal.

* * * * *